US007933993B1

(12) United States Patent  
Skinner

(10) Patent No.: US 7,933,993 B1
(45) Date of Patent: Apr. 26, 2011

(54) RELOCATABLE VIRTUAL PORT FOR ACCESSING EXTERNAL STORAGE

(75) Inventor: Harvey K. Skinner, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1261 days.

(21) Appl. No.: 11/409,852

(22) Filed: Apr. 24, 2006

(51) Int. Cl.
G06F 15/173 (2006.01)

(52) U.S. Cl. ........ 709/226; 709/209; 709/213; 709/229; 711/202; 711/105; 714/2; 710/36

(58) Field of Classification Search ................. 709/226, 709/209, 229; 711/105, 202; 714/2; 710/36
See application file for complete search history.

(56) References Cited

U.S. PATENT DOCUMENTS

| | | | | |
|---|---|---|---|---|
| 6,061,349 A * | 5/2000 | Coile et al. | ..... | 370/389 |
| 6,421,711 B1 * | 7/2002 | Blumenau et al. | ..... | 709/213 |
| 6,446,141 B1 * | 9/2002 | Nolan et al. | ..... | 710/8 |
| 6,493,825 B1 * | 12/2002 | Blumenau et al. | ..... | 713/168 |
| 6,839,746 B1 | 1/2005 | Muthiyan et al. | | |
| 6,988,130 B2 | 1/2006 | Blumenau et al. | | |
| 7,051,182 B2 * | 5/2006 | Blumenau et al. | ..... | 711/202 |
| 7,093,021 B2 * | 8/2006 | Blumenau et al. | ..... | 709/229 |
| 7,484,208 B1 * | 1/2009 | Nelson | ..... | 718/1 |
| 7,668,923 B2 * | 2/2010 | Herring et al. | ..... | 709/209 |
| 7,711,789 B1 * | 5/2010 | Jnagal et al. | ..... | 709/213 |
| 2001/0037371 A1 * | 11/2001 | Ohran | ..... | 709/214 |
| 2003/0200247 A1 | 10/2003 | Banzhaf et al. | | |
| 2003/0204597 A1 * | 10/2003 | Arakawa et al. | ..... | 709/226 |
| 2005/0080982 A1 | 4/2005 | Vasilevsky et al. | | |
| 2005/0081080 A1 * | 4/2005 | Bender et al. | ..... | 714/2 |
| 2005/0157730 A1 * | 7/2005 | Grant et al. | ..... | 370/401 |
| 2005/0232285 A1 * | 10/2005 | Terrell et al. | ..... | 370/401 |
| 2006/0112247 A1 * | 5/2006 | Ramany et al. | ..... | 711/165 |

* cited by examiner

Primary Examiner — Thu Ha T Nguyen

(57) ABSTRACT

The present invention provides for relocatable virtual ports for accessing external storage.

7 Claims, 4 Drawing Sheets

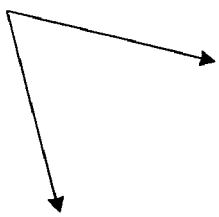

```
                ┌─────────────────────────────────────┐
                │  REGISTERING A RELOCATABLE VIRTUAL PORT │
                │       TO A 1ST PHYSICAL PORT        │
                │                M21                  │
                └─────────────────────────────────────┘
                                  │
                                  ▼
                ┌─────────────────────────────────────┐
                │       ACCCESSING EXTERNAL STORAGE   │
                │          VIA 1ST PHYSICAL PORT      │
                │    VIA SAID RELOCATABLE VIRTUAL PORT│
                │                M22                  │
                └─────────────────────────────────────┘
                                  │
                                  ▼
                ┌─────────────────────────────────────┐
                │  REGISTERING A RELOCATABLE VIRTUAL PORT │
                │       TO A 2ND PHYSICAL PORT        │
                │                M23                  │
                └─────────────────────────────────────┘
                                  │
                                  ▼
                ┌─────────────────────────────────────┐
                │       ACCCESSING EXTERNAL STORAGE   │
                │          VIA 2ND PHYSICAL PORT      │
                │    VIA SAID RELOCATABLE VIRTUAL PORT│
                │                M24                  │
                └─────────────────────────────────────┘
```

FIG. 4

RELOCATABLE VIRTUAL PORT FOR ACCESSING EXTERNAL STORAGE

BACKGROUND OF THE INVENTION

Herein, related art is discussed to provide a context for the present invention. Related art labeled "prior art" is admitted prior art; related art not labeled "prior art" is not admitted prior art.

Many commercial and other enterprises use storage area networks (SANs) for distributing, acquiring, and managing vast quantities of data. A SAN is a network in which one or more host servers access one or more storage units such as hard disks, optical disks, and tape drives. Typically, each host server includes one or more host-bus adapters (HBAs), each with one or more physical ports.

Large SANs tend to employ virtualization on many levels to allow flexible configuration and reconfiguration of hardware resources. Virtual servers can be used so that a single server can emulate several smaller servers, each with its own instance of an operating system. Disk arrays are divided into logical units (LUNs) that can service different host adapter ports (from the same or different physical servers). Multiple virtual HBA ports can be assigned to a physical port and used so that different virtual servers (running on the same server) can have exclusive access to different sets of LUNs using that same physical HBA port.

Security is a general concern for many computing environments and an issue for enterprise-scale computing environments. LUN masking contributes to security by making LUNs discoverable and useable by specified physical ports and no others. More recently, this approach has been extended so that different virtual servers on the same platform (physical server or physical partition of a server) can be assigned different virtual ports, with LUNs being assigned mutually exclusively to ports, whether physical or virtual.

For a virtual server to migrate to and access its LUNs from a new host platform, the original virtual-port assignment for the initial platform's LUNs may have to be cancelled to allow a new virtual-port assignment for the LUNs associated with the new hosting platform's HBA ports. This reassignment can be time consuming and error-prone as virtual-server utility programs may have to be informed of the change in virtual port name. Alternatively, the LUNs can be configured to be accessible from different physical ports, but this can compromise security.

BRIEF DESCRIPTION OF THE DRAWINGS

The following drawings are of embodiments/implementations of the invention and not of the invention itself.

FIG. 4 is a flow chart of another method in accordance with an embodiment of the invention.

DETAILED DESCRIPTION

Figure 1:
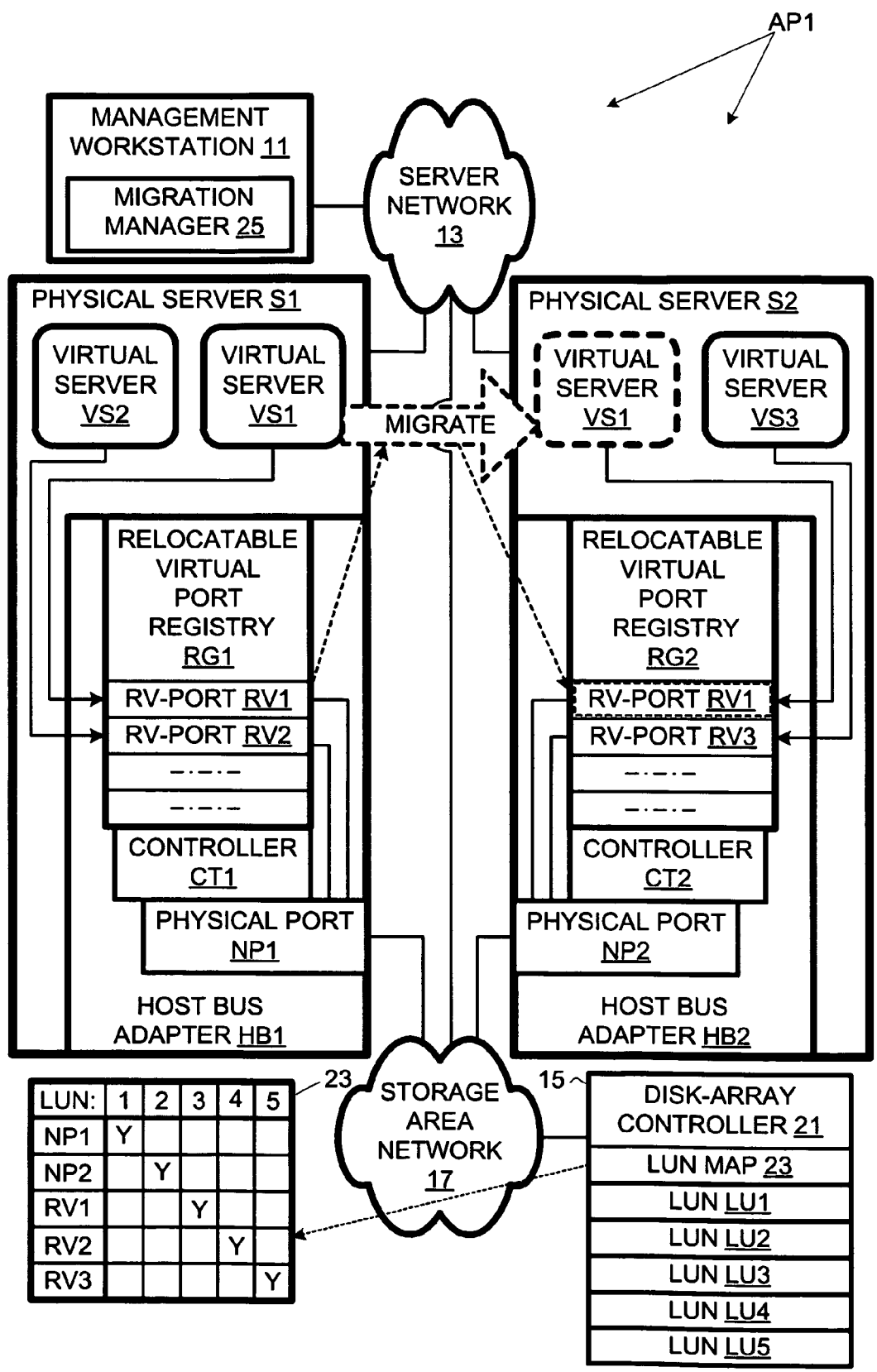
FIG. 1 is a schematic diagram of a server environment in accordance with an embodiment of the invention.

A server environment AP1 incorporating the present invention includes a management workstation 11, servers S1 and S2, a server network 13, a disk array 15, and a storage area network (SAN) 17. Alternative embodiments have different numbers of servers, disk arrays, and storage area networks. Also, the invention provides for different server configurations, including unpartitioned servers (servers with 1 partition), multiple hard partitions, multiple virtual partitions, and various configurations for virtual servers and applications. Embodiments can also provide for disk arrays and other storage devices with varying characteristics, including a range of possible numbers of logical units per disk array. The invention also provides for various storage network technologies including SCSI, SCSI derivatives, fiber channel, Ethernet, etc. Also, the migration function assumed by management workstation 11 can instead be performed by software on one or more physical servers.

Disk array 15 includes a disk-array controller 21 and is divided into five logical units, LU1-LU5. Disk-array controller 21 manages communications with SAN 17, and includes a logical-unit assignment map 23 that indicates, for each logical unit, a SAN address associated with its possible initiator. As shown in the assignment map detail of FIG. 1, each logical unit is assigned to one server port, which can be physical, or relocatable and virtual.

Server S1 has a server OS (not separately shown) that hosts virtual servers, including VS1 and VS2. Physical server S1 includes a physical host-bus adapter HB1 for interfacing server S1 with SAN 17 to provide access to disk array 15. Host-bus adapter HB1 includes a physical port NP1 with an address on SAN 17. Host-bus adapter HB1 also includes a RV-port registry RG1 for storing the identities of relocatable virtual ports, including RV-ports RV1 and RV2. These identities are written into registry RG1 under control of HBA controller CT1. For each registered relocatable virtual port, registry RG1 stores a SAN address and configuration data, including specifications for bandwidth allocations, priority, and quality of service parameters such as special handling options and limits on the number of requests that can be handled at once.

The server OS for server S1 is configured to access logical unit LU1 of disk array 15 via physical port NP1. Virtual server VS1 is configured to access logical unit LU3 via relocatable virtual port RV1; virtual server VS2 is configured to access logical LU4 via relocatable virtual port RV2. Although, the server OS, and virtual servers VS1 and VS2 all use physical port NP1, each has exclusive access to its respective LUN as indicated by the detail of LUN assignment map 23. This exclusivity enhances security, minimizes contentions for storage resources, and minimizes risk of data corruption by other virtual servers.

Server S2 is similar to server S1 and includes a physical host-bus adapter HB2 with a physical port NP2, a controller CT2, and an RV-port registry RG2. A relocatable virtual port RV3 is registered in registry RG2. The OS for server S2 is configured to use physical port NP2 to access disk array 15, which provides the host OS exclusive access for logical unit LU2. A virtual server VS3 running on server S2 is configured to access disk array 15 via relocatable virtual port RV3, which provides exclusive access to logical unit LU5

Shown in dash in FIG. 1 is a post-migration instance of virtual server VS1 on server S2. Also shown in dash in registry RG2 is a post-migration instance of virtual-port RV1. In this case, the dash indicates the future entry of the identity for virtual port RV1 into registry RG2. Alternatively, the dashing can represent a dormant entry that can be activated upon command. In either case, in the time frame represented in FIG. 1, server S2 acts as though virtual server VS1 and virtual-port RV1 were not present.

Figure 2:
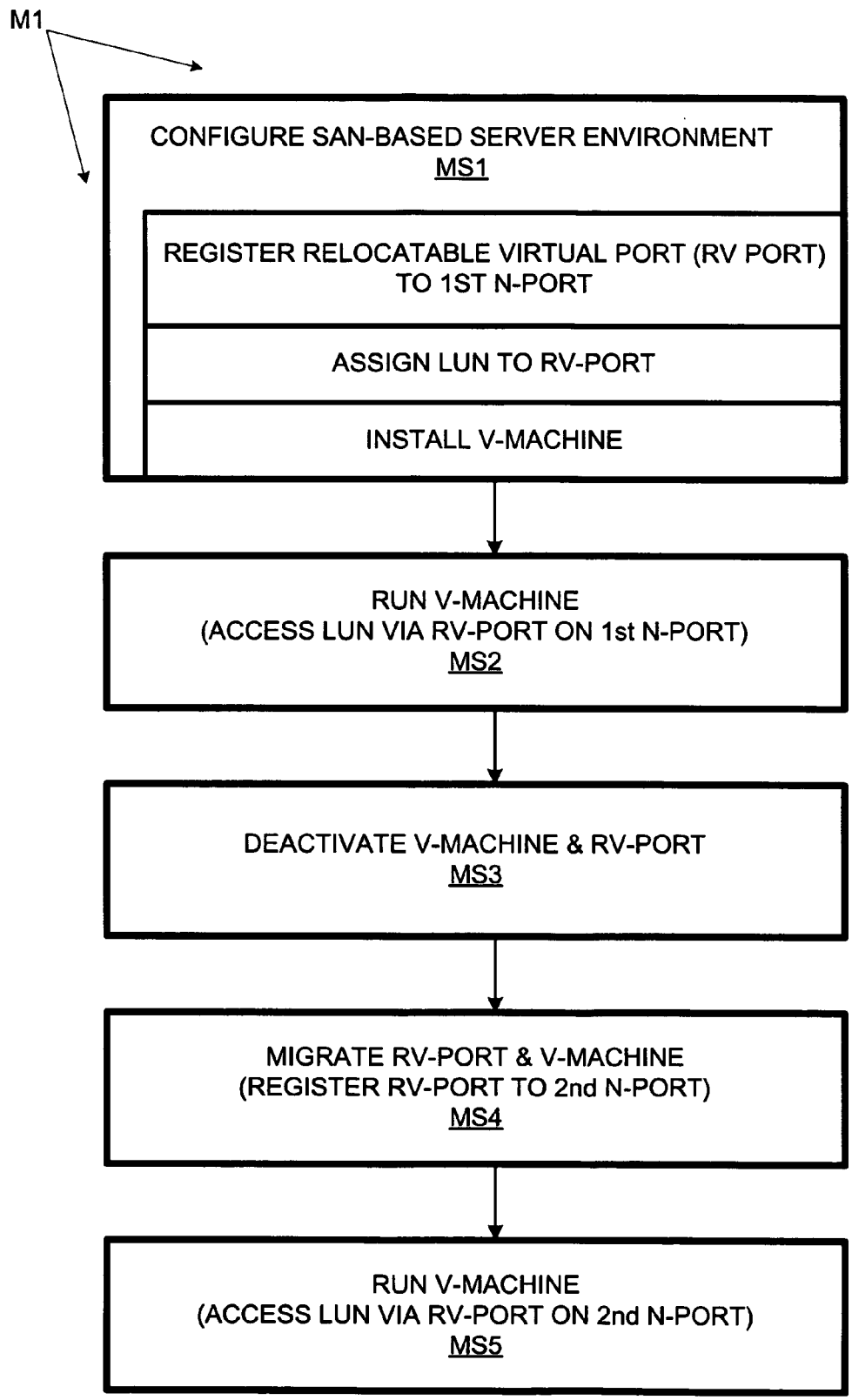
FIG. 2 is a flow chart of a method in accordance with an embodiment of the invention.

The foregoing description referencing FIG. 1 sets the stage for a migration method M1 flow-charted in FIG. 2 and implemented by migration manager 25, software running of management workstation 15. At method segment MS1, server environment AP1 is configured by management workstation 11 as shown in FIG. 1. Configuration can involve programming assignment map 23 for disk array 15, installing active instances of virtual machines, and registering virtual ports to physical ports by storing virtual-port identities (addresses and configuration data) in RV-port registries.

Upon initialization, management workstation 11 assigns each relocatable virtual port RV1, RV2, and RV3 a SAN address in the form of a world-wide port name (WWPN) and/or world-wide node name (WWNN). In other embodiments, other entities such as a SAN switch, can assign the SAN address. To ensure uniqueness, these relocatable virtual port names can include all or part of the names of the physical ports with which they were first associated. Alternatively, workstation 11 can use some other convention to ensure uniqueness of relocatable virtual port names.

During operation at method segment MS2, virtual server VS1 exclusively accesses logical unit LU3 via relocatable virtual port RV1 and physical port NP1. In alternative embodiments, multiple ports can access a single LUN. In the illustrated embodiment, the assignment of LUNs to ports is 1:1.

Various events, such as failures, hardware upgrades, scheduled or unscheduled maintenance, and resource reallocation, can trigger a decision to migrate virtual server VS1 from server S1 to server S2. To this end, the instance of virtual server VS1 on server S1 is deactivated and its configuration data transferred to server S2; in accordance with the invention, relocatable virtual port RV1 is also deactivated, either by deleting its identity from registry RG1 or by setting a flag associated with its entry to registry RG1 to inactive, at method segment MS3.

At method segment MS4, RV-port RV1 is registered in registry RG2 of host-bus adapter HB2. Virtual server VS1 is activated on server S2, adopting the configuration data transferred from server S1, which specifies port RV1 (the virtual server does not need to know that this is a relocatable virtual port) for data storage access. Thus, at method segment MS5, migrated virtual server VS1 accesses logical unit LU3 via this migrated instance of relocatable virtual port RV1 now associated with physical port NP2.

The migrated instantiation of relocatable virtual port RV1 can maintain the same storage network identity and same characteristics of the original version. Thus, the migrated instantiation of virtual server VS1 does not need to reconfigure the port. The LUN map 23 does not have to be updated to accommodate the migration, greatly simplifying the migration process relative to a migration procedure requiring the migrated virtual server to use a new port identity. Also, since the relocatable virtual port identity does not change, migration manager 25 and other virtual-server utilities are not updated regarding the identity, e.g., name and characteristics, of the virtual port used to access SAN 17.

Figure 3:
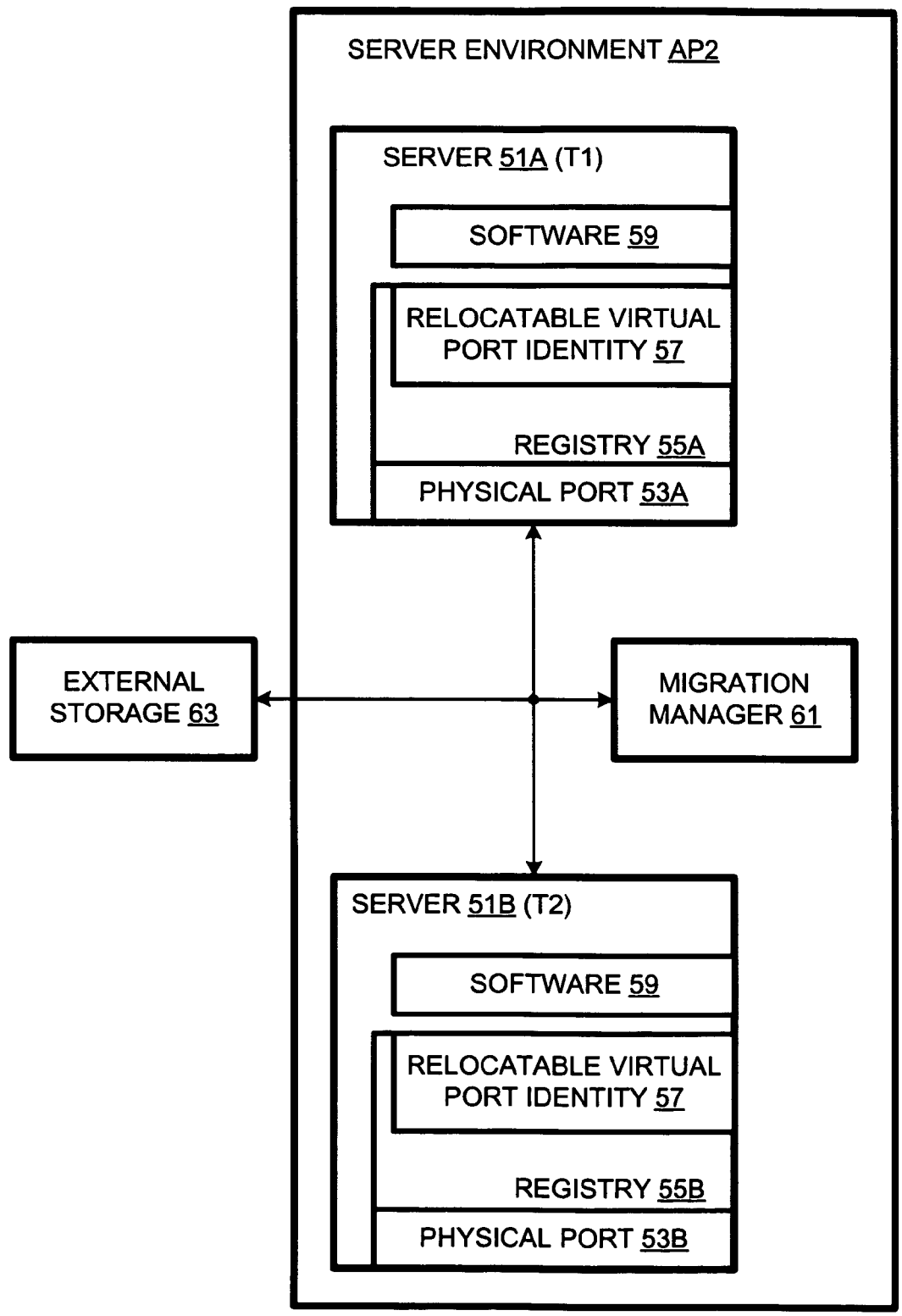
FIG. 3 is a block diagram of another server environment in accordance with an embodiment of the invention.

A server environment AP2 in accordance with an embodiment of the invention is shown in FIG. 3 having a first server 51A, a second server 51B, and a migration manager 61. Servers 51A and 51B respectively have physical ports 53A and 53B for accessing external storage 63. Registries 55A and 55B are respectively associated with physical ports 53A and 53B for storing an identity 57 for a relocatable virtual port.

At time T1, software 59 is running on server 51A and not on server 51B. Also at time T1, registry 55A stores identity 57, while registry 55B does not. Accordingly, software 59 can access external storage 63 via physical port 53A by referring to virtual port identity 57. At time T2, software 59 is running on server 51B and not on server 51A. Also at time T2, registry 55B stores identity 57, while registry 55A does not. Accordingly, software 59 can access external storage 63 via physical port 53B by referring to virtual port identity 57.

A method M2, in accordance with an embodiment of the invention and flow-charted in FIG. 4, can be practiced in the context of server environment AP2 or another server environment. At method segment M21, a relocatable virtual port is registered to a first physical port. At method segment M22, external storage is accessed via the first physical port by accessing the relocatable virtual port. At method segment M23, the relocatable virtual port is registered to a second physical port, in this case on a different server. At method segment M24, the software running on server 51B accesses the external storage via the second physical port by accessing the relocatable virtual port.

In the illustrated embodiments, registering involves writing the identity of a virtual port into a relocatable virtual port registry of a host-bus adapter. Also, the controller for the adapter should be able to de-register a port by deleting its identity from the registry. Alternatively, the identity can be retained in a dormant form in a registry, e.g., by setting a flag to inactive. This can save the effort of rewriting or re-registering the identity if and when the virtual port returns to its original physical port. Also, port identities can be registered long before they are made active so that the virtual ports are in place by the time the virtual server migration has commenced.

The present invention simplifies migration of virtual servers; since relocatable virtual ports migrate with virtual servers, new relocatable virtual ports do not need to be assigned and configured. Conflicts between a newly migrated virtual server and pre-existing virtual servers are minimized since, obviously, the pre-existing virtual servers cannot have been using the virtual port that came with the migrated virtual server. Also, the SAN-based storage devices do not have to be reconfigured and LUNs do not need to be remapped to new addresses as the old address still works, albeit from a new location. Finally, utility programs, such as SAN management utilities, do not have to reconcile with a changed port assignment for a migrated virtual server, simplifying design for the programs and reducing opportunities for errors.

As suggested above, the invention can apply to server environments with one or more servers, one or more disk arrays. The servers can be divided into hard partitions, virtual partitions, or not be partitioned. The disk arrays can be divided into logical units or not. The storage-area network can be fiber channel, coaxial, Ethernet, etc. It can provide for exclusive access to LUNs, and provide for multi-access for LUNs. Disk volumes can be mirrored or provide more sophisticated forms of redundancy for fail-safe operation. Likewise, the server environment can provide for clustering of servers and partitions.

To facilitate upgrades and maintenance, the new capabilities provided by the invention can be implemented on a removable card. However, the invention also permits the physical port, registry, and controller to reside on a motherboard or a backplane.

Herein, a "server" or "physical server" is a computer that provides services to another computer. A "virtual server" is software running on a server that appears to server software as though it were a physical server; for example, it can run an operating system other than the operating system on the hosting physical server. A "server environment" is a set of computers, including at least one computer, that collectively function as a server; for example, a storage area network in which a web server distributes data stored on an external disk array is a server environment.

For purposes herein, a "physical port" is a physical device on a server that provides for connecting the server to a storage area network. A "virtual port" is a logical or virtual entity that functions as a physical port from the perspective software running on the host server, but has no physical existence apart from an underlying physical port. A "relocatable virtual port" is a virtual port for which the underlying physical port can be changed, e.g., between physical ports on the same or different servers.

The foregoing description contemplates that relocatable virtual ports are either registered and active or unregistered and inactive. However, in some embodiments, it is possible for the identity of a relocatable virtual port to be entered into a registry without it being activated. In the latter case, migration can be facilitated by: 1) inactivating (e.g., setting a flag to "inactive") an identity instance of a migrating relocatable virtual port on the registry for the departed physical port; and 2) activating (e.g., by setting a flag to "active") an identity instance of the relocatable virtual port on the destination physical port. Also, it is possible for registries for different HBAs to include long non-volatile lists of possible relocatable virtual port addresses, and activating and deactivating these to effect migration. These and other variations upon and modifications to the described embodiments are provided for by the present invention, the scope of which is defined by the appended claims.

What is claimed is:

1. A server environment comprising:
   a first server having a first host-bus adapter with a first physical port and a first registry for storing a virtual-port identity of a relocatable virtual port in association with said first physical port so that a program running on said first server can access external storage via said first physical port by accessing said relocatable virtual port;
   a second server having a second host-bus adapter with a second physical port and a second registry;
   a migration manager for migrating said program from said first server to said second server and said virtual port identity from said first registry to said second registry so that said program running on said second server can access external storage via said second physical port by accessing said relocatable virtual port; and
   said program, is a virtual server and said relocatable virtual port provides exclusive access to a logical unit of said external storage so that no other virtual server running on said servers can access said logical unit without using said relocatable virtual port.

2. A server environment as recited in claim 1 further comprising:
   a controller for deactivating said virtual-port identity as stored in said first registry.

3. A server environment as recited in claim 2 wherein, said migration manager assigns said virtual-port identity.

4. A method comprising:
   registering a relocatable virtual port to a first physical port by storing an identity of said relocatable virtual port in a registry of a first host-bus adapter including said first physical port;
   accessing external storage via said first physical port by accessing said relocatable virtual port;
   registering said relocatable virtual port to a second physical port by storing an identity of said relocatable virtual port in a registry of a second host-bus including said second physical port;
   accessing said external storage via said second physical port by accessing said relocatable virtual port;
   inactivating the registration of said relocatable virtual port before registering said relocatable virtual port to said second physical port; and
   migrating a virtual server from a first server containing said first physical port to a second server containing said second physical port between said accessing, said virtual server performing said accessing.

5. A method as recited in claim 4 further comprising assigning an identity to said relocatable virtual port prior to said registering to said first physical port.

6. A method as recited in claim 5 wherein said identity specifies a bandwidth allocation or a priority or both.

7. A method as recited in claim 4 further comprising dissociating said identity from said first physical port prior to said accessing via said second, physical port.

* * * * *

UNITED STATES PATENT AND TRADEMARK OFFICE
CERTIFICATE OF CORRECTION

| | | |
|---|---|---|
| PATENT NO. | : 7,933,993 B1 | Page 1 of 1 |
| APPLICATION NO. | : 11/409852 | |
| DATED | : April 26, 2011 | |
| INVENTOR(S) | : Harvey K. Skinner | |

It is certified that error appears in the above-identified patent and that said Letters Patent is hereby corrected as shown below:

In column 6, line 1, in Claim 1, delete "program," and insert -- program --, therefor.

Signed and Sealed this
Twenty-third Day of August, 2011

David J. Kappos
*Director of the United States Patent and Trademark Office*